(12) United States Patent
Lee et al.

(10) Patent No.: US 7,411,574 B2
(45) Date of Patent: Aug. 12, 2008

(54) TABLET LIQUID CRYSTAL DISPLAY DEVICE

(75) Inventors: Choel Hwan Lee, Kyoungki-do (KR); Kwang Hyun Park, Seoul (KR)

(73) Assignee: Boe Hydis Technology Co., Ltd. (KR)

( * ) Notice: Subject to any disclaimer, the term of this patent is extended or adjusted under 35 U.S.C. 154(b) by 578 days.

(21) Appl. No.: 11/142,744

(22) Filed: Jun. 1, 2005

(65) Prior Publication Data
US 2006/0232562 A1 Oct. 19, 2006

(30) Foreign Application Priority Data
Apr. 18, 2005 (KR) .................. 10-2005-0031803

(51) Int. Cl.
G09G 3/36 (2006.01)
(52) U.S. Cl. .................... 345/104; 345/87; 345/173
(58) Field of Classification Search ............ 345/87–96, 345/103–104, 173–179; 178/18.01–18.09
See application file for complete search history.

(56) References Cited

U.S. PATENT DOCUMENTS 5,003,167 A 3/1991 Arques

2006/0169973 A1* 8/2006 Isa et al. .................. 257/40

FOREIGN PATENT DOCUMENTS

JP H04-52485 6/1986
JP 63-205724 8/1988

* cited by examiner

*Primary Examiner*—Vijay Shankar
(74) *Attorney, Agent, or Firm*—Seyfarth Shaw LLP

(57) ABSTRACT

Disclosed is a tablet liquid crystal display device which senses light applied from a light irradiating device to receive an input signal applied from an exterior. The tablet liquid crystal display device comprising: a liquid crystal panel for displaying an image, including a black matrix formed in a lattice form; and a signal recognizing section for generating an electromotive force according to a light signal inputted from an exterior, wherein the signal recognizing section comprises: a plurality of first photoelectromotive force generation layers, each of which is located above the black matrix in a sectional view, is overlapped with the black matrix in a plan view, and extends in a first direction; an insulating layer deposited to cover at least an upper surface of the first electromotive force generation layers; a plurality of second photoelectromotive force generation layers, each of which is located above the black matrix in a sectional view, is overlapped with the black matrix in a plan view, and extends in a second direction perpendicular to the first direction; and a protection layer deposited over an entire area of the signal recognizing section.

7 Claims, 2 Drawing Sheets

TABLET LIQUID CRYSTAL DISPLAY DEVICE

BACKGROUND OF THE INVENTION

1. Field of the Invention

The present invention relates to a tablet liquid crystal display device, and more particularly to a tablet liquid crystal display device which senses light applied from a light irradiating device to receive an input signal applied from an exterior.

2. Description of the Prior Art

As generally known in the art, a tablet personal computer (PC) including a tablet liquid crystal display device is a PC having merits of both a notebook computer and a personal digital assistant (PDA). Such a tablet PC has the same basic structure as that of a notebook computer to enable the user to directly write, and can be assembled/disassembled to be used as a paper. The tablet liquid crystal display device of the tablet PC includes a separate reception device for receiving exterior signals, may be classified into a touch screen type device and a digitizer type device depending on input and reception methods.

In the touch screen type of tablet liquid crystal display device, a touch screen panel is attached to a front portion of the liquid crystal display device and generates a voltage or current signal corresponding to a position pressed by a user finger or a pressure transmitting device which is an input means, thereby receiving a command or information indicated by the user. A liquid crystal panel of the liquid crystal display device displays an image according to a command or information indicated by the user as described above. Meanwhile, the digitizer type of tablet liquid crystal display device has a separate antenna board attached to a rear portion of the liquid crystal display device in order to receive an input signal from an electronic pen which is an input means. Therefore, a command or information indicated by the user is inputted through the electronic pen, and a liquid crystal panel of the liquid crystal display device displays an image according to such a command or information.

From among such conventional tablet liquid crystal display devices, since the touch screen type of tablet liquid crystal display device includes a touch panel attached to the front portion of the liquid crystal display device, the permeability of the liquid crystal panel is deteriorated, so that the displayed image has a decreased luminance. Also, according to the conventional touch screen type of tablet liquid crystal display device, since the touch panel and the liquid crystal panel include a plurality of transparent layers, a light interference phenomenon may occur between the transparent layers, thereby deteriorating the image quality of the display screen. Besides, since an input signal is inputted by a user finger or the pressure transmitting device, a touch error of the user may cause a wrong operation of the tablet liquid crystal display device.

Meanwhile, in the digitizer type of tablet liquid crystal display device, since the antenna board for receiving an input signal from the electronic pen and a control panel for signal processing are separately contained, the thickness, weight and manufacturing cost of a system including the tablet liquid crystal display device increase, thereby deteriorating the value of the tablet liquid crystal display device. Also, the electromagnetic waves generated from the electronic pen may cause an image signal distortion phenomenon at an outer portion of a display area due to a metallic bezel surrounding the outline of the liquid crystal display device, thereby causing an input error and a wrong operation of the tablet PC to deteriorate the image quality of the display screen. Besides, the electromagnetic waves generated from the electronic pen and driving signals of the liquid crystal display device are interfered with each other, so that the tablet liquid crystal display device may malfunction.

SUMMARY OF THE INVENTION

Accordingly, the present invention has been made to solve the above-mentioned problems occurring in the prior art, and an object of the present invention is to provide a tablet liquid crystal display device which can prevent the image quality of the display screen from being deteriorated by luminance decrease and/or distortion phenomenon(s) of an image signal, and can be manufactured to have reduced thickness and weight without any wrong operation of the liquid crystal display device.

In order to accomplish this object, there is provided a tablet liquid crystal display device comprising: a liquid crystal panel for displaying an image, including a black matrix formed in a lattice form; and a signal recognizing section for generating an electromotive force according to a light signal inputted from an exterior, wherein the signal recognizing section comprises: a plurality of first photoelectromotive force generation layers, each of which is located above the black matrix in a sectional view, is overlapped with the black matrix in a plan view, and extends in a first direction; an insulating layer deposited to cover at least an upper surface of the first electromotive force generation layers; a plurality of second photoelectromotive force generation layers, each of which is located above the black matrix in a sectional view, is overlapped with the black matrix in a plan view, and extends in a second direction perpendicular to the first direction; and a protection layer deposited over an entire area of the signal recognizing section.

In the tablet liquid crystal display device, each of the first and second photoelectromotive force generation layers comprises a lower electrode layer, a P-type semiconductor layer, an N-type semiconductor layer and an upper electrode layer, which are sequentially deposited.

In the tablet liquid crystal display device, each of the first and second photoelectromotive force generation layers comprises a lower electrode layer, an N-type semiconductor layer, a P-type semiconductor layer and an upper electrode layer, which are sequentially deposited.

In the tablet liquid crystal display device, each of the first and second photoelectromotive force generation layers has a line width equal to or smaller than that of the black matrix of the lattice form, so that the first and second photoelectromotive force generation layers are included in the black matrix in a plan view.

In the tablet liquid crystal display device, the signal recognizing section is located on the liquid crystal panel.

In the tablet liquid crystal display device, the liquid crystal panel further includes first and second substrates located on and beneath the black matrix, respectively, and the signal recognizing section is located between the first and second substrates.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
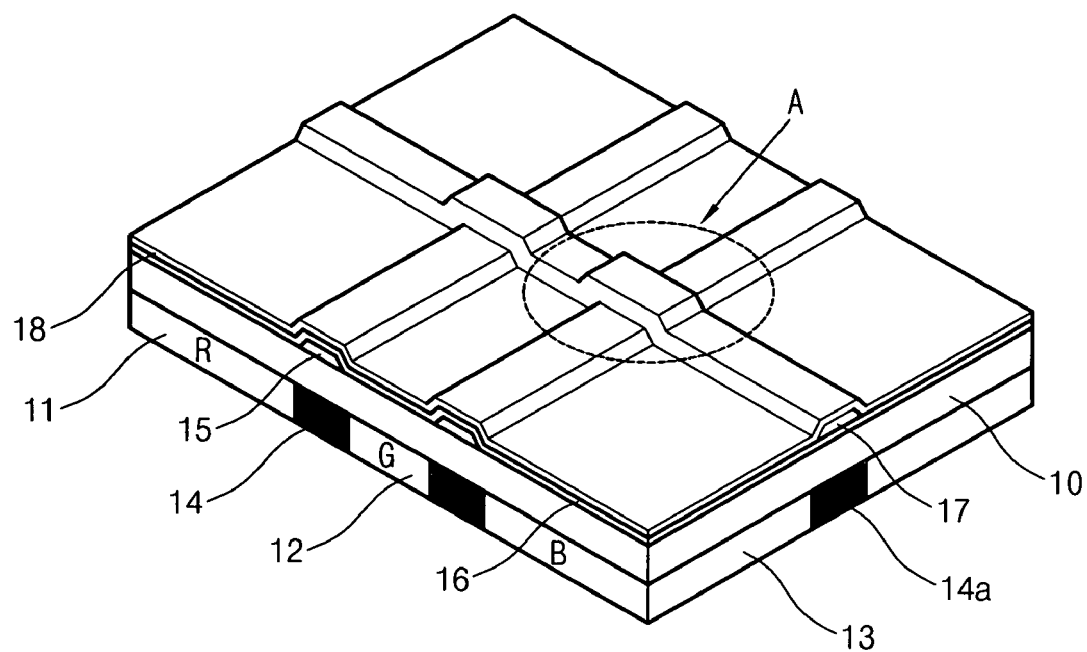
FIGS. 1 to 4 are views illustrating a tablet liquid crystal display device according to an embodiment of the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
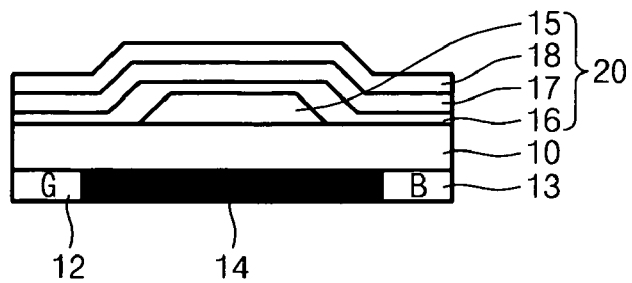

FIGS. 1 and 2 are views for explaining a tablet liquid crystal display device according to an embodiment of the present invention, in which FIG. 1 is a perspective view of the tablet liquid crystal display device and FIG. 2 is a sectional view of portion 'A' in FIG. 1.

The tablet liquid crystal display device according to an embodiment of the present invention includes a liquid crystal panel and a signal recognizing section 20. The liquid crystal panel includes R, G and B pixels 11, 12 and 13 and a color filter substrate 10, which contains a black matrix 14 and 14a formed in y and x directions in order to separate the R, G and B pixels 11, 12 and 13 and to intercept (block) light. The signal recognizing section 20 senses light irradiated from an exterior and receives a light signal which is an input signal. Herein, the signal recognizing section 20 may be formed on the upper surface of the color filter substrate 10 of the liquid crystal panel as shown in FIGS. 1 and 2, or may be formed between the color filter substrate 10 and the black matrix 14 and 14a. Hereinafter, the tablet liquid crystal display device according to an embodiment of the present invention will be described with respect to the case in which the signal recognizing section 20 is formed on the upper surface of the liquid crystal panel, that is, on the upper surface of the color filter substrate 10 of the liquid crystal panel.

Figure 4:
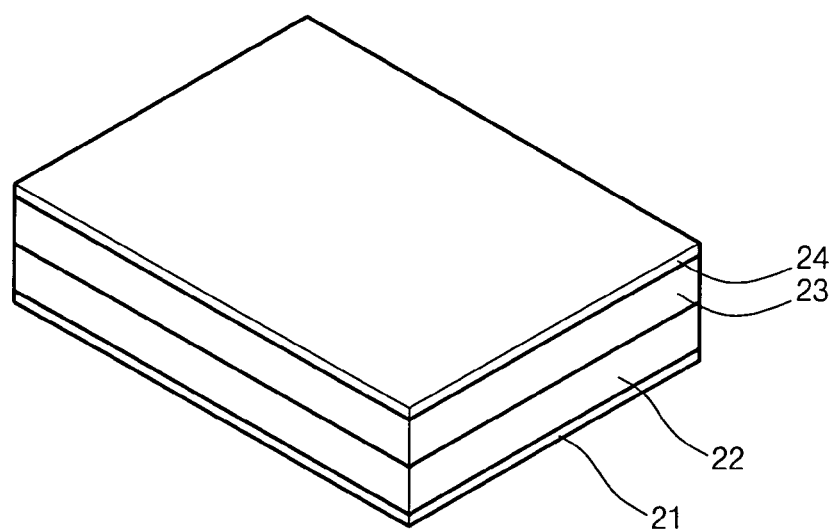

A first photoelectromotive force generation layer 15 is formed on the upper surface of the color filter substrate 10 of the liquid crystal panel in the same direction as that of the y-directional black matrix 14, that is, in the y direction. As shown in FIG. 4, the first photoelectromotive force generation layer 15 includes a lower electrode 21, a P-type semiconductor layer 22 formed on the upper surface of the lower electrode 21, an N-type semiconductor layer 23 formed on the upper surface of the P-type semiconductor layer 22, and an upper electrode 24. In addition, the first photoelectromotive force generation layer 15 is formed with a width equal to or smaller than that of the y-directional black matrix 14. An insulating layer 16 is formed on the entire upper area of the color filter substrate 10 including the first photoelectromotive force generation layer 15 formed on the color filter substrate 10. A second photoelectromotive force generation layer 17 is formed on the upper surface of the insulating layer 16 in the same direction as that of the x-directional black matrix 14a, that is, in the x direction. Similarly to the first photoelectromotive force generation layer 15, the second photoelectromotive force generation layer 17 is formed with a width equal to or smaller than that of the x-directional black matrix 14a. The first and second photoelectromotive force generation layers 15 and 17 are insulated from each other by the insulating layer 16 formed therebetween, and is protected by a protection layer 18 which is formed on the entire upper area of the insulating layer 16 including the second photoelectromotive force generation layer 17. In this case, the insulating layer 16 and the protection layer 18 are formed by transparent insulation films, and may be formed only on the area of the y and x directional black matrix 14 and 14a or may be formed on the entire area of the color filter substrate 10 of the liquid crystal panel.

Figure 3:
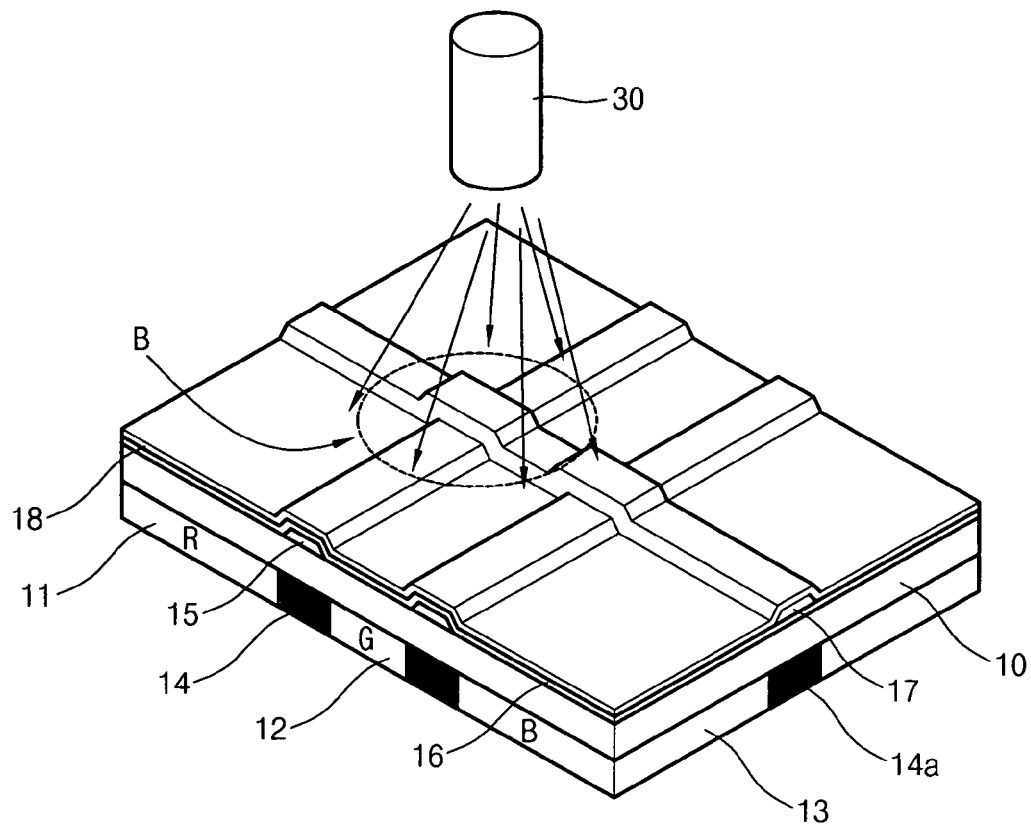

To the tablet liquid crystal display device as described above according to an embodiment of the present invention, when a light signal (input signal) is applied from exterior by a light irradiating device 30 as shown in FIG. 3, the photovoltaic effect is generated by the light signal in the first and second photoelectromotive force generation layer 15 and 17, which are formed in the y and x directions, respectively. Thus, an electromotive force is generated in the first and second photoelectromotive force generation layer 15 and 17, and a voltage generated thereby is transmitted to a control means (not shown) to display an image on the tablet liquid crystal display device.

In other words, when the light irradiating device 30 irradiates light to apply a light signal (input signal) to the tablet liquid crystal display device, the light signal is transmitted to a predetermined area of the liquid crystal panel. Such a light signal is applied to the first and second photoelectromotive force generation layer 15 and 17, which are formed in the y and x directions, respectively, over the black matrix 14 and 14a of the liquid crystal panel, so that the first and second photoelectromotive force generation layer 15 and 17 having received the light signal generates an electromotive force by the photovoltaic effect. That is, the first and second photoelectromotive force generation layer 15 and 17 functions as a capacitor, and generates a voltage of a predetermined level according to the applied light signal. The voltage of the predetermined level is transmitted to the control means, so that a command and/or information applied through the light irradiating device 30 by the user from an exterior is received to the tablet liquid crystal display device. The tablet liquid crystal display device displays an image on the liquid crystal panel according to a command or information applied by the user from an exterior as described above. In this case, the light irradiating device 30 generates a straight light such as a laser beam, and a light signal of the straight light is applied to area "B" located over the R, G and B pixels 11, 12 and 13. That is, the light signal is applied to area "B" over the R, G and B pixels 11, 12 and 13 so that the first and second photoelectromotive force generation layer 15 and 17 formed in the y and x directions over the black matrix 14 and 14a may sense the light signal.

As described above, the tablet liquid crystal display device according to an embodiment of the present invention includes the signal recognizing section 20 formed on the liquid crystal panel of the display screen displaying an image. The signal recognizing section 20 is formed over the area of the black matrix 14 and 14a of the liquid crystal panel, which is a non-transmissive area of an image signal. Therefore, the tablet liquid crystal display device according to the present invention does not require a separate reception device, and can prevent the luminance of the displayed image from being deteriorated. In addition, since a command and/or information is applied by the light irradiating device 30 to the tablet liquid crystal display device, an input signal can be precisely applied even from a distance, and it is possible to prevent the distortion phenomenon of input signals and image signals.

In the above description, an embodiment of the present invention is explained with respect to the tablet liquid crystal display device which includes the signal recognizing section 20 formed on the upper surface of the liquid crystal panel, that is, on the upper surface of the color filter substrate 10 of the liquid crystal panel. As another embodiment of the present invention, the signal recognizing section 20 of the tablet liquid crystal display device may be formed between the color filter substrate 10 and the black matrix 14 and 14a of the liquid crystal panel. In this case, the same effect as that described above can be achieved.

According to an embodiment of the present invention, the tablet liquid crystal display device includes the sensing means which senses light irradiated to the liquid crystal panel of the tablet liquid crystal display device to receive an input signal, so that it is possible to prevent deterioration of the image quality of the display screen and a wrong operation of the tablet liquid crystal display device. In addition, the tablet liquid crystal display device having reduced thickness and weight can be manufactured.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A tablet liquid crystal display device comprising:
a liquid crystal panel for displaying an image, including a black matrix formed in a lattice form; and
a signal recognizing section for generating an electromotive force according to a light signal inputted from an exterior,
wherein the signal recognizing section comprises:
a plurality of first photoelectromotive force generation layers, each of which is located above the black matrix in a sectional view, is overlapped with the black matrix in a plan view, and extends in a first direction;
an insulating layer deposited to cover at least an upper surface of the first electromotive force generation layers;
a plurality of second photoelectromotive force generation layers, each of which is located above the black matrix in a sectional view, is overlapped with the black matrix in a plan view, and extends in a second direction perpendicular to the first direction; and
a protection layer deposited over an entire area of the signal recognizing section.

2. The tablet liquid crystal display device as claimed in claim 1, wherein each of the first and second photoelectromotive force generation layers comprises a lower electrode layer, a P-type semiconductor layer, an N-type semiconductor layer and an upper electrode layer, which are sequentially deposited.

3. The tablet liquid crystal display device as claimed in claim 1, wherein each of the first and second photoelectromotive force generation layers comprises a lower electrode layer, an N-type semiconductor layer, a P-type semiconductor layer and an upper electrode layer, which are sequentially deposited.

4. The tablet liquid crystal display device as claimed in claim 2, wherein each of the first and second photoelectromotive force generation layers has a line width equal to or smaller than that of the black matrix of the lattice form, so that the first and second photoelectromotive force generation layers are included in the black matrix in a plan view.

5. The tablet liquid crystal display device as claimed in claim 3, wherein each of the first and second photoelectromotive force generation layers has a line width equal to or smaller than that of the black matrix of the lattice form, so that the first and second photoelectromotive force generation layers are included in the black matrix in a plan view.

6. The tablet liquid crystal display device as claimed in claim 1, wherein the signal recognizing section is located on the liquid crystal panel.

7. The tablet liquid crystal display device as claimed in claim 1, wherein the liquid crystal panel further includes first and second substrates located on and beneath the black matrix, respectively, and the signal recognizing section is located between the first and second substrates.

* * * * *